US00RE46087E

(19) United States
(12) Reissued Patent
Wirt

(10) Patent Number: US RE46,087 E
(45) Date of Reissued Patent: Aug. 2, 2016

(54) PRANK APPARATUS WITH AMUSEMENT EFFECT

(71) Applicant: Jamie Wirt, Orland Park, IL (US)

(72) Inventor: Jamie Wirt, Orland Park, IL (US)

(21) Appl. No.: 14/555,139

(22) Filed: Nov. 26, 2014

Related U.S. Patent Documents

Reissue of:
(64) Patent No.: 8,602,836
Issued: Dec. 10, 2013
Appl. No.: 13/352,490
Filed: Jan. 18, 2012

(51) Int. Cl.
*A63H 5/00* (2006.01)
*B41J 7/32* (2006.01)

(52) U.S. Cl.
CPC .... *B41J 7/32* (2013.01); *A63H 5/00* (2013.01)

(58) Field of Classification Search
CPC ..... A65H 5/00; B41J 7/32
USPC ..... 446/397; 74/39, 40, 521, 534
See application file for complete search history.

(56) References Cited

U.S. PATENT DOCUMENTS

| | | | | |
|---|---|---|---|---|
| 2,612,776 | A * | 10/1952 | Klas | 73/147 |
| 4,507,043 | A * | 3/1985 | Flatau | 414/719 |
| 6,149,490 | A * | 11/2000 | Hampton et al. | 446/353 |
| 6,572,433 | B1 * | 6/2003 | Hou | 446/353 |
| 6,764,431 | B2 * | 7/2004 | Yoss | 482/56 |

* cited by examiner

*Primary Examiner* — Matthew C Graham
(74) *Attorney, Agent, or Firm* — Hinshaw & Culbertson LLP

(57) ABSTRACT

A prank apparatus includes a base unit, a driving device and a decorative unit. The base unit includes a housing, a support rack, a sounder, a sensor, a power supply, and a control board. The driving includes a mounting seat, a drive wheel, a drive motor, a driven wheel, a support bar, and two torsion springs. [The] *In the preferred embodiment, the* decorative unit includes an extension shank having a first end connected with the support bar and a second end provided with a guide slot, a movable pin movably mounted in the guide slot, a first link having a first end pivotally connected with the movable pin, a decorative body connected with a second end of the first link, and a second link having a first end pivotally connected with the support rack and a second end pivotally connected with the first link.

9 Claims, 11 Drawing Sheets

PRANK APPARATUS WITH AMUSEMENT EFFECT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a toy and, more particularly, to a prank (or tricky) apparatus with an amusement effect.

2. Description of the Related Art

A conventional prank toy has a strange [outlook] *appearance* to cause a frightening effect to people. Another conventional prank toy includes an upright plate with the figure of a human body to achieve a frightening effect to people. In addition, the conventional prank toy can emit sound or light simultaneously to enhance the frightening effect. However, the conventional prank toy cannot cause an interaction with other people, thereby limiting its versatility. In addition, the conventional prank toy has a boring structure and a limited function so that it cannot satisfy the consumers' requirements. A conventional prank apparatus in accordance with the prior art shown in FIGS. 1-7 comprises a base unit 1, a driving device 2 mounted on the base unit 1, and a decorative unit 3 mounted on the driving device 2. The base unit 1 includes a housing 11, a sounder 12 mounted in the housing 11, a sensor 13 mounted in the housing 11, a control switch 14 mounted on the housing 11, a power supply 15 mounted in the housing 11, and a control board 16 mounted in the housing 11. The sounder 12 of the base unit 1 can emit sound with an amusement effect. The sensor 13 of the base unit 1 is operable to actuate the driving device 2. The power supply 15 of the base unit 1 is connected to the driving device 2 to supply an electric power to the driving device 2. The control switch 14 of the base unit 1 is connected between the power supply 15 and the driving device 2 to turn on/off the driving device 2. The control board 16 of the base unit 1 is connected to the sensor 13 to select and control the detection states of the sensor 13. The driving device 2 includes a mounting seat 21 mounted on the housing 11 of the base unit 1, a drive wheel 23 rotatably mounted in the mounting seat 21 and having a periphery locally provided with a plurality of drive teeth 24, a drive motor 22 mounted in the mounting seat 21 and connected with the drive wheel 23 to rotate the drive wheel 23, a driven wheel 25 rotatably mounted on the mounting seat 21 and having a periphery locally provided with a plurality of driven teeth 26 meshing with the drive teeth 24 of the drive wheel 23, a support bar 27 connected with the driven wheel 25 to move in concert with the driven wheel 25, and two torsion springs 28 mounted on two opposite sides of the driven wheel 25 and each having a first end connected with the mounting seat 21 and a second end connected with the support bar 27. The decorative unit 3 is mounted on the support bar 27 of the driving device 2 and includes a decorative body 31, a fixing bar 32 secured in the decorative body 31, and an extension shank 33 having a first end connected with the fixing bar 32 and a second end connected with the upper end of the support bar 27 so that the decorative body 31 is movable in concert with the support bar 27 of the driving device 2. The decorative body 31 of the decorative unit 3 is a detachable element and has a determined shape, pattern, figure or the like. Preferably, the decorative body 31 of the decorative unit 3 is made of a cloth which is decorated to have the profile of a ghost or the like to provide a frightening effect. In assembly, the drive motor 22 is initially mounted in the mounting seat 21. Then, the mounting seat 21 is mounted on the housing 11. Then, the drive wheel 23 is mounted in the mounting seat 21. Then, the torsion springs 28 are mounted on the two opposite sides of the driven wheel 25. Then, the driven wheel 25 is mounted on the mounting seat 21, with the driven teeth 26 of the driven wheel 25 meshing with the drive teeth 24 of the drive wheel 23. Then, the first end of each of the torsion springs 28 is connected with the mounting seat 21, and the second end of each of the torsion springs 28 is connected with the support bar 27. Finally, the extension shank 33 is connected with the support bar 27 to connect the decorative unit 3 with the driving device 2, thereby accomplishing assembly of the prank apparatus. As shown in FIG. 4, the base unit 1 further includes a plurality of connecting brackets 17 mounted on a periphery of the housing 11, and a plurality of stands 18 connected with the connecting brackets 17 respectively to enhance rigidity and stability of the housing 11. In operation, referring to FIGS. 5-7 with reference to FIGS. 1-3, the control switch 14 of the base unit 1 is switched to turn on the driving device 2 so that the drive motor 22 can be operated to drive the drive wheel 23. At this time, the user can transmit a signal to the sensor 13. For example, the user can transmit a sound signal to the sensor 13 by clapping, shouting or the like. In such a manner, after the sensor 13 receives the signal from the user, the sensor 13 transmits a signal to the control board 16 which starts the drive motor 22 which drives the drive wheel 23 to rotate in the counterclockwise direction as shown in FIG. 5. At this time, the driven teeth 26 of the driven wheel 25 mesh with the drive teeth 24 of the drive wheel 23 so that the driven wheel 25 is driven by the drive wheel 23 to rotate in the clockwise direction so as to move the support bar 27 and the extension shank 33 downward and backward and to compress the torsion springs 28 for storing a restoring force. Subsequently, the drive wheel 23 is further rotated in the counterclockwise direction until the driven teeth 26 of the driven wheel 25 disengage the drive teeth 24 of the drive wheel 23 as shown in FIG. 6 so that the driven wheel 25 is released from the drive wheel 23 and is pushed by the restoring force of the torsion springs 28 to rotate in the counterclockwise direction so as to move the support bar 27 and the extension shank 33 upward. In such a manner, the support bar 27 and the extension shank 33 are moved upward and forward by the restoring force of the torsion springs 28 so that the decorative body 31 of the decorative unit 3 is instantaneously sprung upward and forward. At the same time, the sounder 12 can emit a sound when the decorative body 31 of the decorative unit 3 is sprung. Thus, after the sensor 13 receives the signal from the user, the decorative body 31 of the decorative unit 3 is sprung upward and forward, and the sounder 12 emits a corresponding sound as to achieve a video/audio frightening amusement effect. In practice, the prank apparatus is [laced] *placed* in a site, such a haunted house and the like, and is available for a festival, such as the Halloween day and the like. Subsequently, the drive wheel 23 is further rotated in the counterclockwise direction until the driven teeth 26 of the driven wheel 25 mesh with the drive teeth 24 of the drive wheel 23 again as shown in FIG. 7 so that the driven wheel 25 is driven by the drive wheel 23 to rotate in the clockwise direction again so as to move the support bar 27 and the extension shank 33 downward and backward and to compress the torsion springs 28 for storing a restoring force.

BRIEF SUMMARY OF THE INVENTION

The primary objective of the present invention is to provide a prank apparatus having an excellent tricky amusement effect.

According to the primary advantage of the present invention, after the sensor receives the signal from the user, the decorative body of the decorative unit is initially moved downward and backward slowly and then sprung upward and forward suddenly, and the sounder emits a corresponding sound simultaneously.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
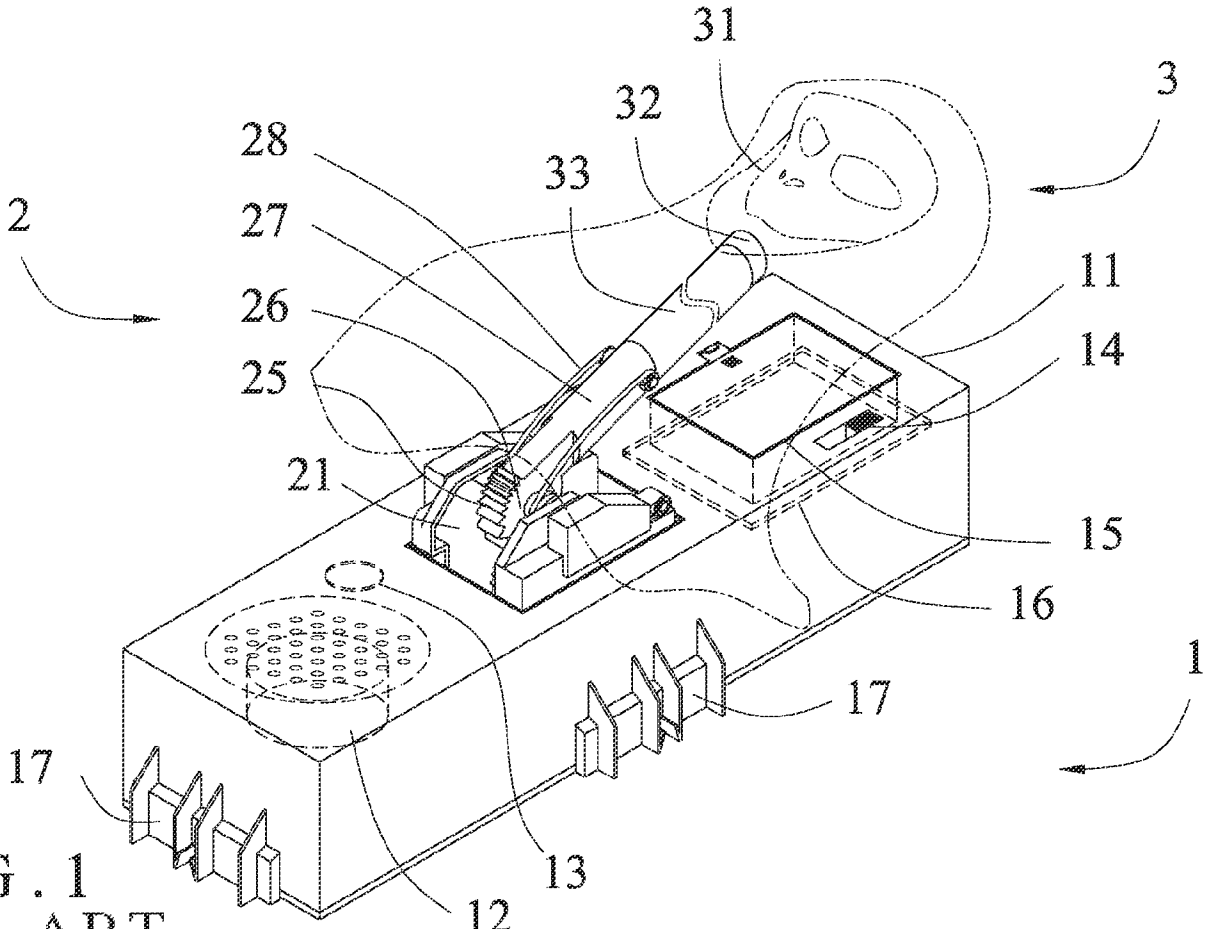
FIG. 1 PRIOR ART
FIG. 1 is a perspective view of a conventional prank apparatus in accordance with the prior art.
Figure 2:
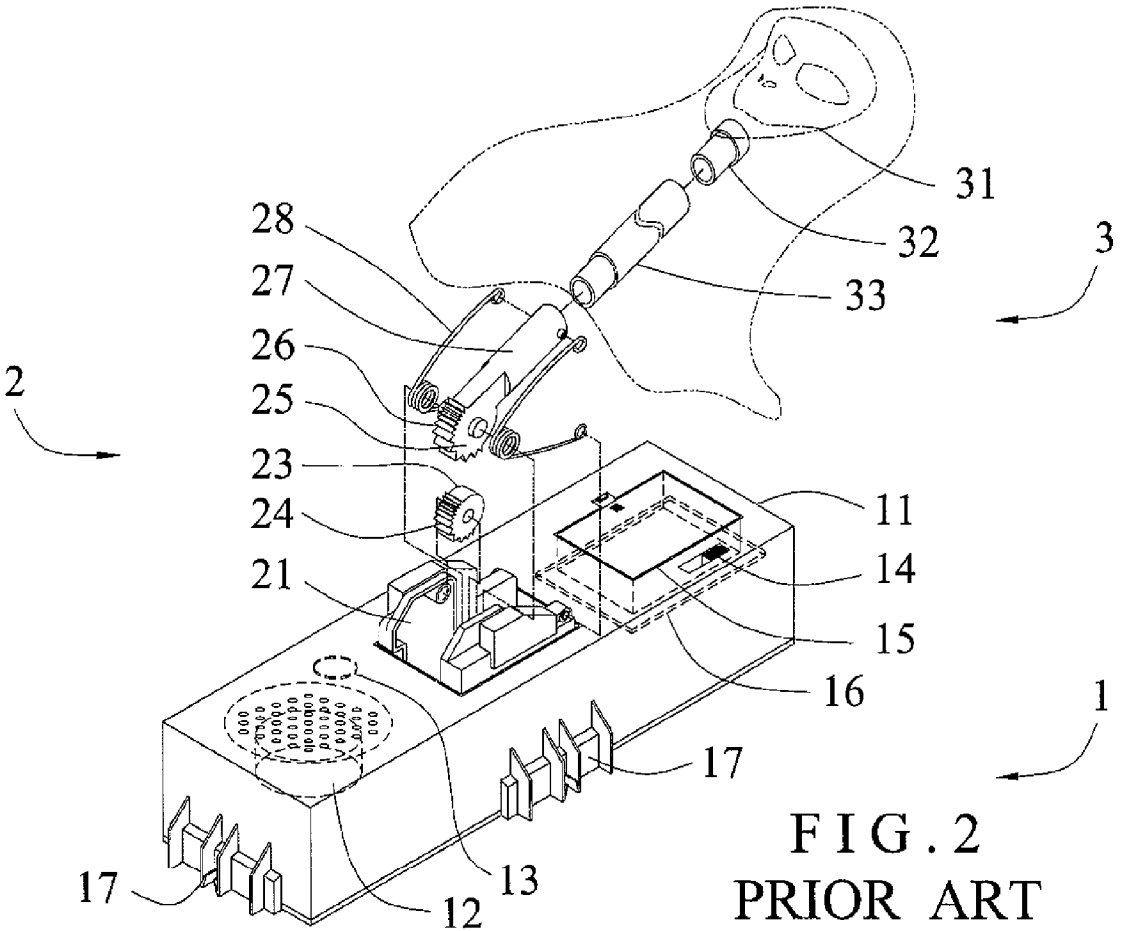
FIG. 2 PRIOR ART
FIG. 2 is a partially exploded perspective view of the conventional prank apparatus as shown in FIG. 1.
Figure 3:
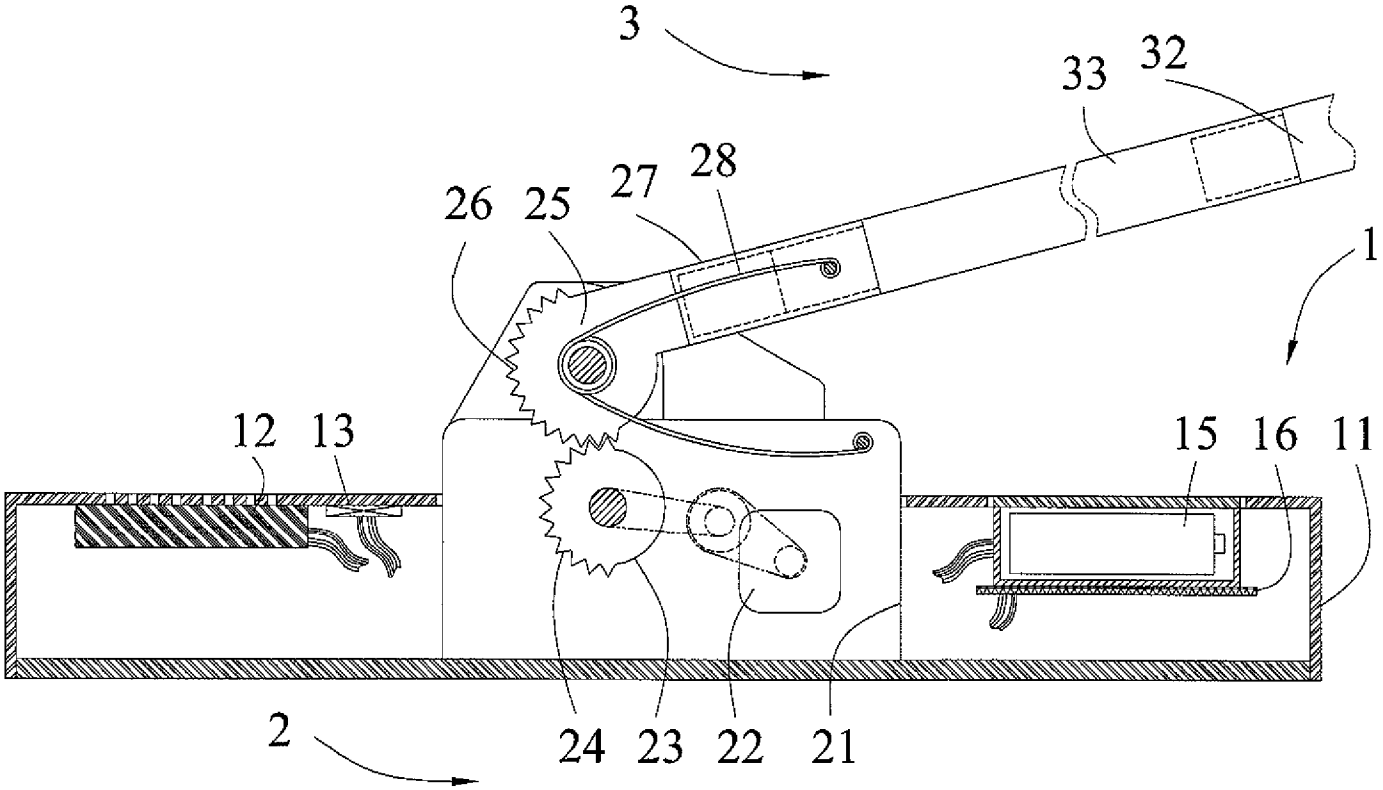
FIG. 3 PRIOR ART
FIG. 3 is a side cross-sectional view of the conventional prank apparatus as shown in FIG. 1.
Figure 4:
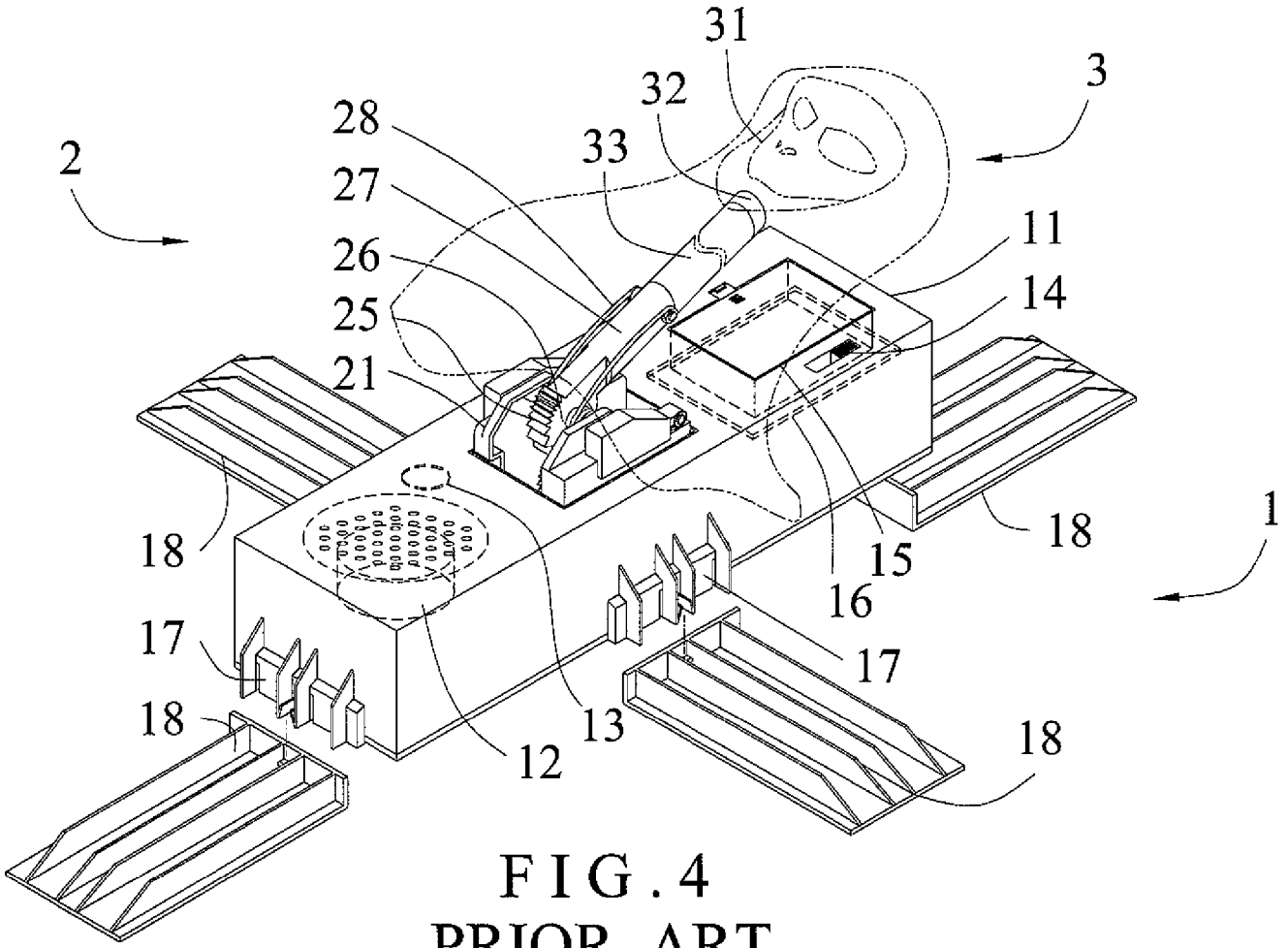
FIG. 4 PRIOR ART
FIG. 4 is a partially exploded perspective view of another conventional prank apparatus.
Figure 5:
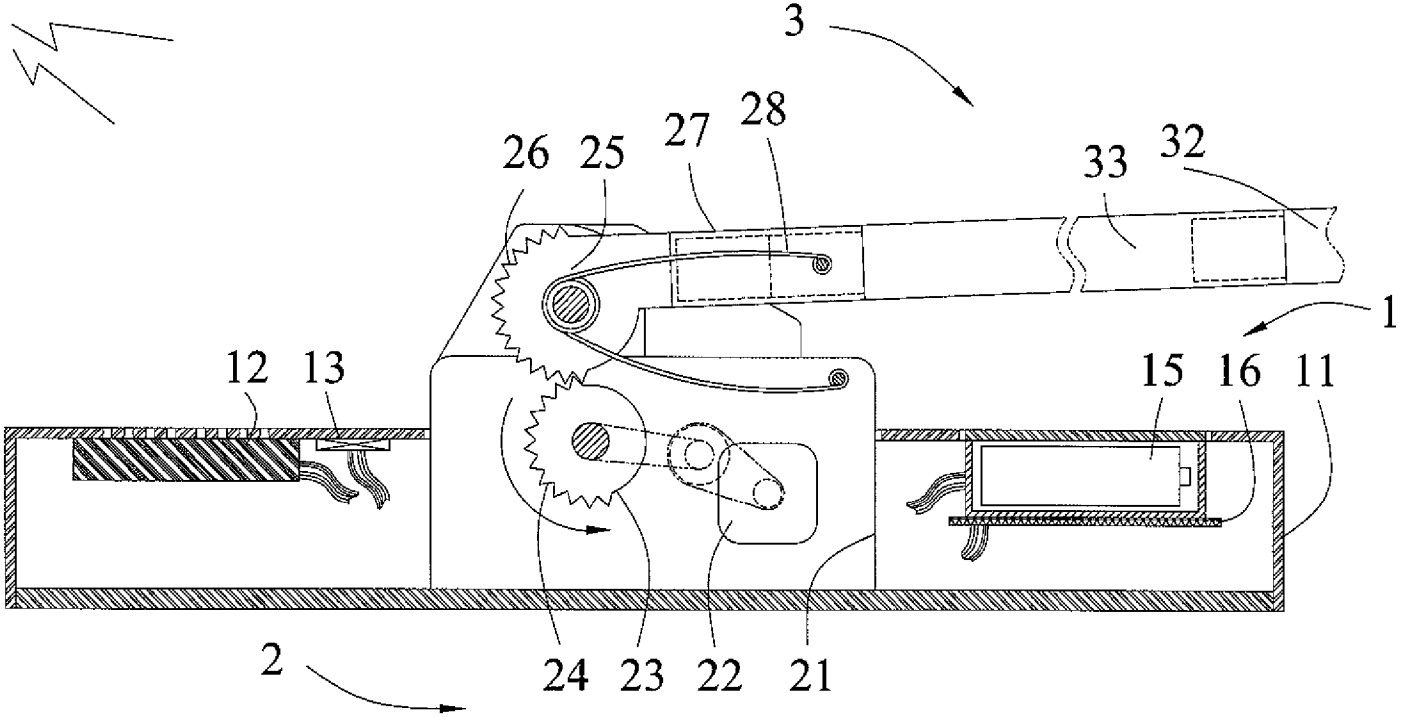
FIG. 5 PRIOR ART
FIG. 5 is a schematic operational view of the conventional prank apparatus as shown in FIG. 3.
Figure 6:
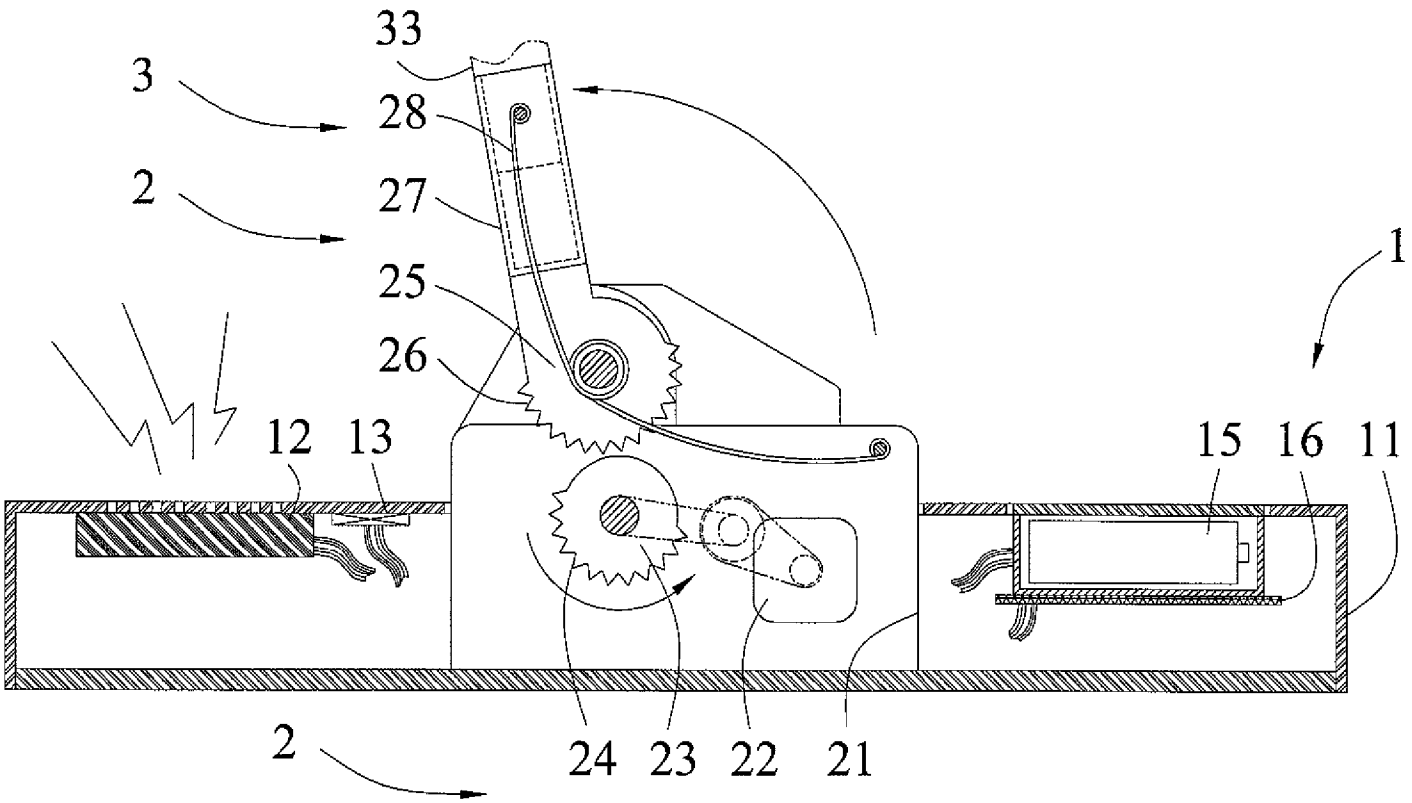
FIG. 6 PRIOR ART
FIG. 6 is a schematic operational view of the conventional prank apparatus as shown in FIG. 5.
Figure 7:
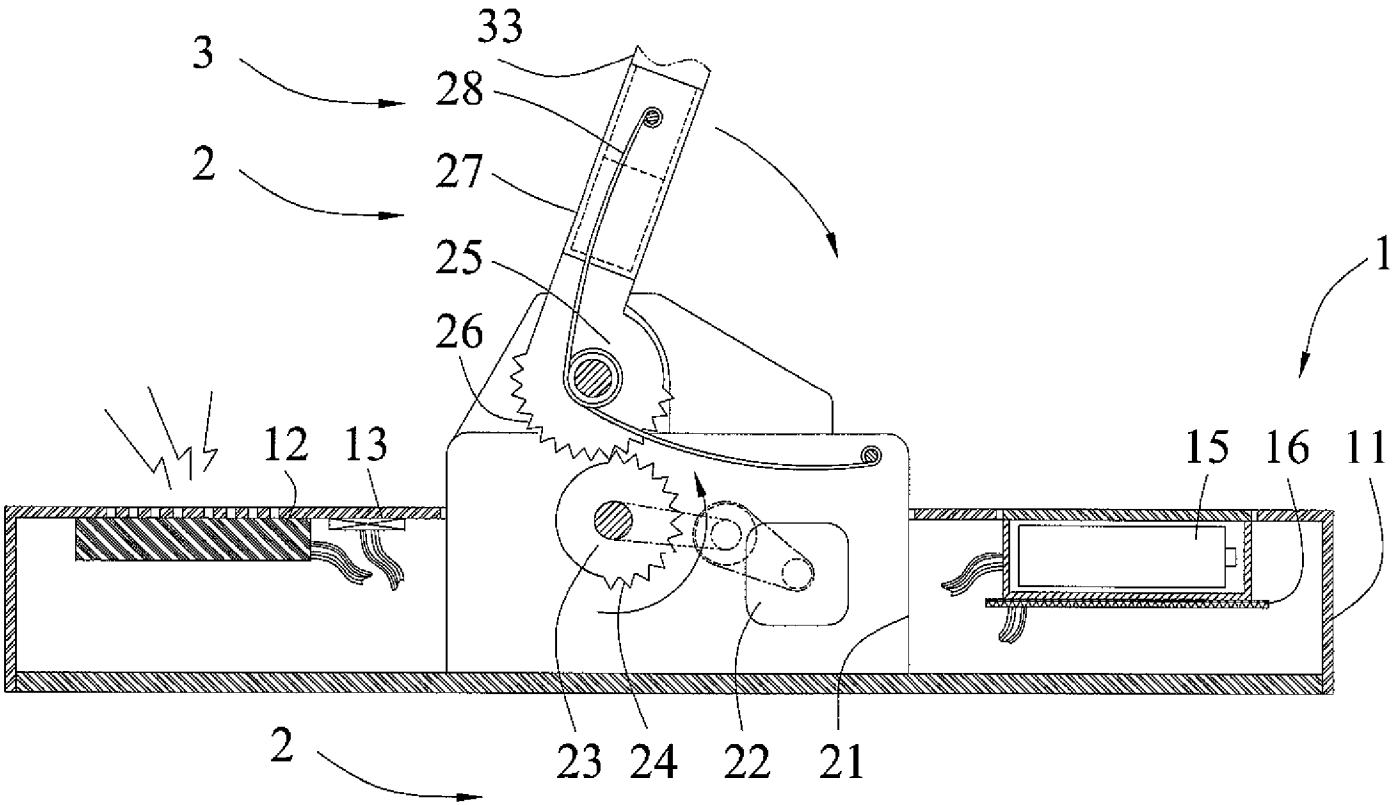
FIG. 7 PRIOR ART
FIG. 7 is a schematic operational view of the conventional prank apparatus as shown in FIG. 6.
Figure 8:
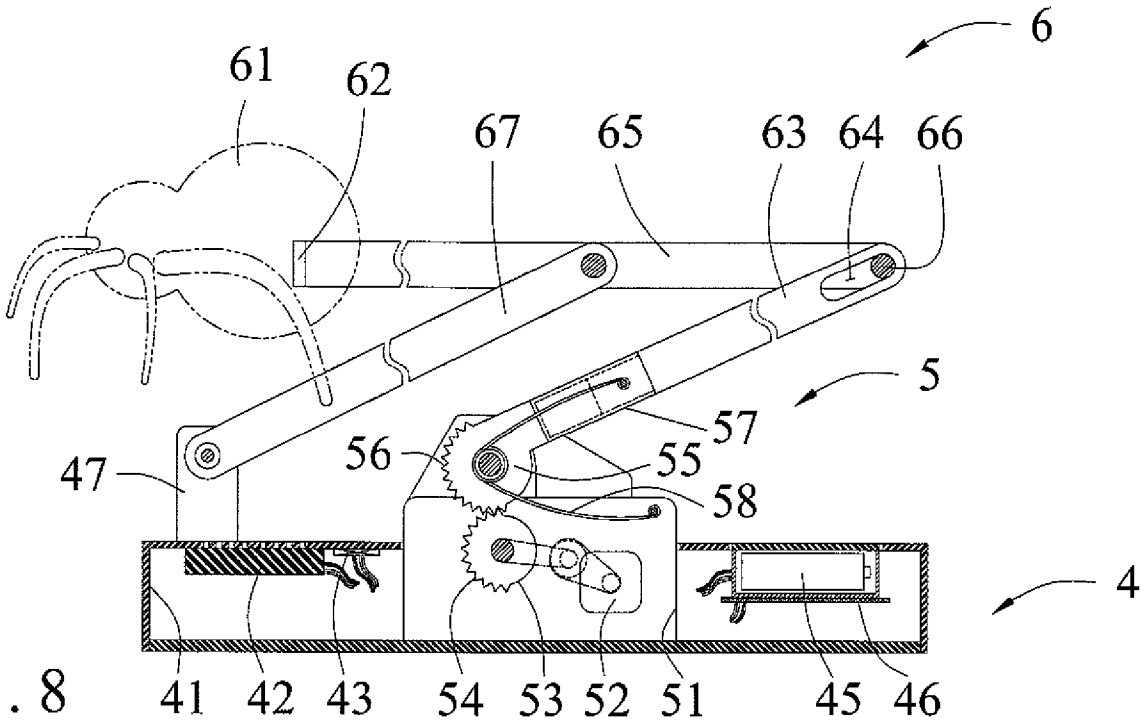
FIG. 8 is a side cross-sectional view of a prank apparatus in accordance with the preferred embodiment of the present invention.

Referring to the drawings and initially to FIG. 8, a prank apparatus in accordance with the present invention comprises a base unit 4, a driving device 5 mounted on the base unit 4, and a decorative unit 6 mounted on the driving device 5.

The base unit 4 includes a housing 41, a sounder 42 mounted in the housing 41, a sensor 43 mounted in the housing 41 and located beside the sounder 42, a power supply 45 mounted in the housing 41, and a control board 46 mounted in the housing 41. The sounder 42 of the base unit 4 is located in the front end of the housing 41 and can emit a sound with an amusement effect. The sensor 43 of the base unit 4 is operable to actuate the driving device 5. In the preferred embodiment of the present invention, the sensor 43 of the base unit 4 is a light sensor, a sound sensor, a footpad control switch, a try-me switch or a combination of the above-mentioned parts. The power supply 45 of the base unit 4 is connected to the driving device 5 to supply an electric power to the driving device 5. The control board 46 of the base unit 4 is located under the power supply 45 and is connected to the sensor 43 to select and control the detection states of the sensor 43.

The driving device 5 is operable by the sensor 43 of the base unit 4. The driving device 5 is mounted on the housing 41 of the base unit 4 and includes a mounting seat 51 mounted on the housing 41 of the base unit 4, a drive wheel 53 rotatably mounted in the mounting seat 51 and having a periphery locally provided with a plurality of drive teeth 54, a drive motor 52 mounted in the mounting seat 51 and connected with the drive wheel 53 to rotate the drive wheel 53, a driven wheel 55 rotatably mounted on the mounting seat 51 and having a periphery locally provided with a plurality of driven teeth 56 meshing with the drive teeth 54 of the drive wheel 53, a support bar 57 connected with the driven wheel 55 to move in concert with the driven wheel 55, and two torsion springs 58 mounted on two opposite sides of the driven wheel 55 and each having a first end connected with the mounting seat 51 and a second end connected with the support bar 57. The driven wheel 55 of the driving device 5 is disposed above the drive wheel 53. The support bar 57 of the driving device 5 is formed on and extended outward from a side of the driven wheel 55. Each of the torsion springs 58 has a substantially V-shaped profile.

In the preferred embodiment of the present invention, the base unit 4 further includes a support rack 47 mounted on the housing 41. The decorative unit 6 is mounted on the support bar 57 of the driving device 5 and the support rack 47 of the base unit 4. The decorative unit 6 includes an extension shank 63 having a first end connected with the support bar 57 of the driving device 5 and a second end provided with an elongate guide slot 64, a movable pin 66 movably mounted in the guide slot 64 of the extension shank 63, a first link 65 having a first end pivotally connected with the movable pin 66, a decorative body 61 connected with a second end of the first link 65, and a second link 67 having a first end pivotally connected with the support rack 47 of the base unit 4 and a second end pivotally connected with the first link 65. The second end of the second link 67 is located between the movable pin 66 and the decorative body 61. The decorative body 61 is movable in concert with the support bar 57 of the driving device 5 and is provided with a connector 62 connected with the second end of the first link 65.

Figure 9:
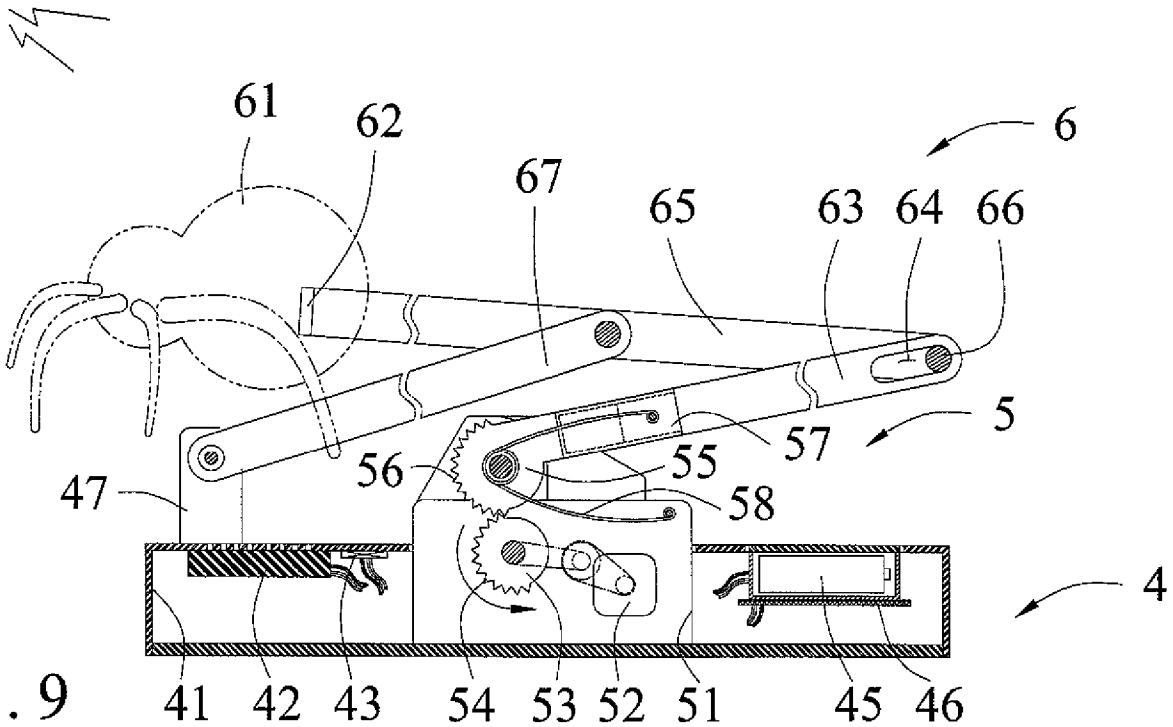
FIG. 9 is a schematic operational view of the prank apparatus as shown in FIG. 8.
Figure 10:
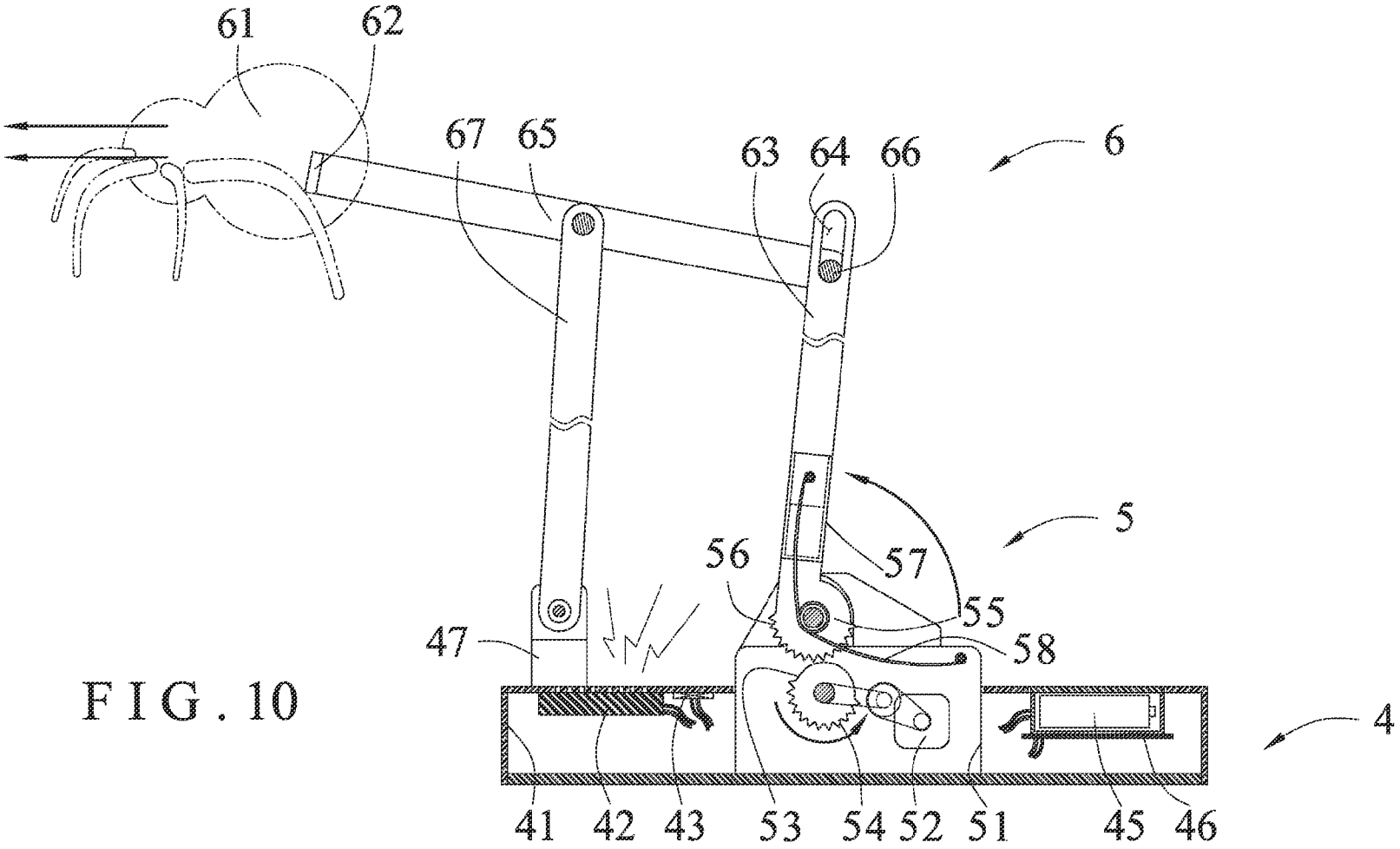
FIG. 10 is a schematic operational view of the prank apparatus as shown in FIG. 9.
Figure 11:
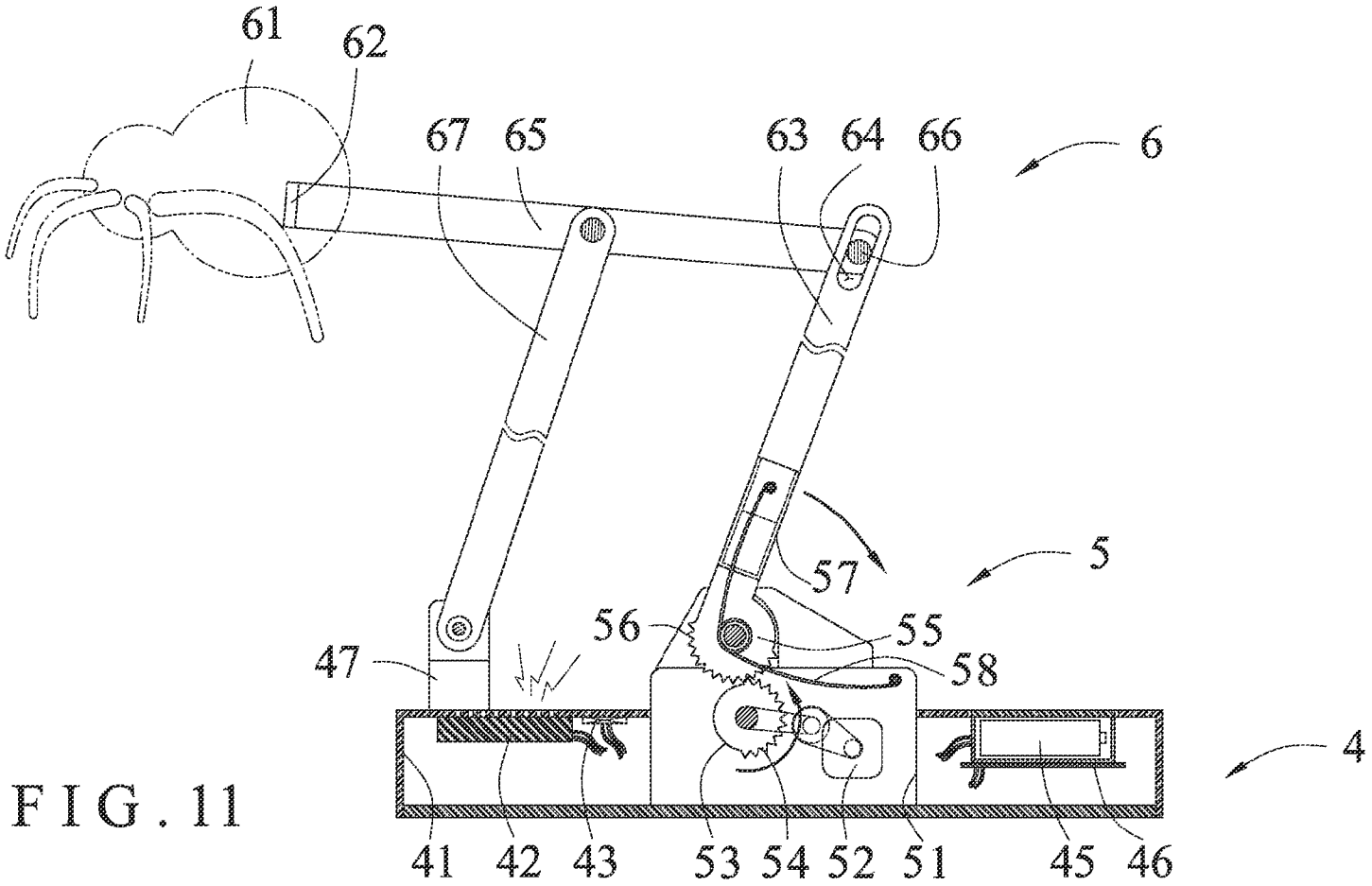
FIG. 11 is a schematic operational view of the prank apparatus as shown in FIG. 10.

In operation, referring to FIGS. 9-11 with reference to FIG. 8, the base unit 4 is operated and switched to turn on the driving device 5 so that the drive motor 52 can be operated to drive the drive wheel 53. At this time, the user can transmit a signal to the sensor 43. For example, the user can transmit a light-sensitive signal, such as an infrared ray and the like, to the sensor 43. In such a manner, after the sensor 43 receives the signal from the user, the sensor 43 transmits a signal to the control board 46 which starts the drive motor 52 which drives the drive wheel 53 to rotate in the counterclockwise direction as shown in FIG. 9. At this time, the driven teeth 56 of the driven wheel 55 mesh with the drive teeth 54 of the drive wheel 53 so that the driven wheel 55 is driven by the drive wheel 53 to rotate in the clockwise direction so as to move the support bar 57 and the extension shank 63 downward and backward and to compress the torsion springs 58 for storing a restoring force. Subsequently, the drive wheel 53 is further rotated in the counterclockwise direction until the driven teeth 56 of the driven wheel 55 disengage the drive teeth 54 of the drive wheel 53 as shown in FIG. 10 so that the driven wheel 55 is released from the drive wheel 53 and is pushed by the restoring force of the torsion springs 58 to rotate in the counterclockwise direction so as to move the support bar 57 and the extension shank 63 upward. In such a manner, when the support bar 57 and the extension shank 63 are moved upward and forward by the restoring force of the torsion springs 58, the first link 65 is moved upward and forward by [a sliding motion of the movable pin 66 in the guide slot 64] *said upward and forward motion* of the extension shank 63, and the second link 67 is moved upward and forward by [push] *said upward and forward motion* of the first link 65 so that the decorative body 61 of the decorative unit 6 is instantaneously sprung upward and forward, *and when extension shank 63 reaches a generally vertical orientation, decorative body 61 is permitted to continue its upward and forward motion by a sliding motion of the movable pin 66 in the guide slot 64 of the extension shank 63*. At the same time, the sounder 42 can emit a sound when the decorative body 61 of the decorative unit 6 is sprung upward and forward. Thus, after the sensor 43 receives the signal from the user, the decorative body 61 of the decorative unit 6 is sprung upward and forward, and the sounder 42 emits a corresponding sound so as to achieve a video/audio frightening amusement effect. Subsequently, the drive wheel 53 is further rotated in the counterclockwise direction until the driven teeth 56 of the driven wheel 55 mesh with the drive teeth 54 of the drive wheel 53 again as shown in FIG. 11 so that the driven wheel 55 is driven by the drive wheel 53 to rotate in the clockwise direction again so as to move the support bar 57 and the extension shank 63 downward and backward and to compress the torsion springs 58 for storing a restoring force.

In a further preferred embodiment of the present invention, the sensor 43 of the base unit 4 is a contact switch (such as a footpad control switch, a try-me switch or the like). In practice, the sensor 43 of the base unit 4 has a connecting line which has a terminal embedded in a determined position of the housing 41. Thus, when the user touches the terminal of the connecting line of the sensor 43, the sensor 43 of the base unit 4 is operated to actuate the driving device 5.

Accordingly, after the sensor 43 receives the signal from the user, the decorative body 61 of the decorative unit 6 is initially moved downward and backward slowly and then sprung upward and forward suddenly, and the sounder 42 emits a corresponding sound simultaneously. In addition, the sensor 43 of the base unit 4 is operated in an optical, acoustical and manual contact manner so that the user can control the sensor 43 to actuate the driving device 5 so as to move the decorative body 61 of the decorative unit 6 easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A prank apparatus, comprising:

a base unit;

a driving device mounted on the base unit; and a decorative unit mounted on the driving device;

wherein the base unit includes a housing, a sounder mounted in the housing, a sensor mounted in the housing, a power supply mounted in the housing, and a control board mounted in the housing;

the driving device includes a mounting seat mounted on the housing of the base unit, a drive wheel rotatably mounted in the mounting seat and having a periphery locally provided with a plurality of drive teeth, a drive motor mounted in the mounting seat and connected with the drive wheel to rotate the drive wheel, a driven wheel rotatably mounted on the mounting seat and having a periphery locally provided with a plurality of driven teeth meshing with the drive teeth of the drive wheel, a support bar connected with the driven wheel to move in concert with the driven wheel, and two torsion springs mounted on two opposite sides of the driven wheel and each having a first end connected with the mounting seat and a second end connected with the support bar;

the base unit further [includes] *including* a support rack mounted on the housing;

the decorative unit [is] *being* mounted on the support bar of the driving device and the support rack of the base unit;

the decorative unit [includes] *including*:

an extension shank having a first end connected with the support bar of the driving device and a second end provided with an elongate guide slot;

a movable [in] *pin* movably mounted in the guide slot of the extension shank;

a first link having a first end pivotally connected with the movable pin;

a decorative body connected with a second end of the first link; and a second link having a first end pivotally connected with the support rack of the base unit and a second end pivotally connected with the first link.

2. The prank apparatus of claim 1, wherein the decorative body is provided with a connector connected with the second end of the first link.

3. The prank apparatus of claim 1, wherein the second end of the second link is located between the movable pin and the decorative body.

4. The prank apparatus of claim 1, wherein the driving device is operable by the sensor of the base unit, the decorative body is movable in concert with the support bar of the driving device, and the sensor of the base unit is a light sensor, a sound sensor, a footpad control switch or a try-me switch that is operable to actuate the driving device.

*5. A prank apparatus, comprising:*

*a base unit;*

*a power supply;*

*a driving device powered by the power supply, mounted on the base unit; and*

*a decorative unit mounted on the driving device;*

*the driving device including a drive wheel mounted on the base unit and having a periphery locally provided with a plurality of drive teeth, a drive motor mounted on the base unit and connected with the drive wheel to rotate the drive wheel, a driven wheel rotatably mounted on the base unit and having a periphery locally provided plurality of driven teeth intermittently meshing with the drive teeth of the drive wheel to rotate in a driven direction when the drive wheel rotates in a driving direction, a support bar connected with the driven wheel to move in concert with the driven wheel, and a torsion spring having a first end connected with the base unit and a second end connected with the support bar and configured to bias the driven wheel to rotate in a springing direction and the support bar to pivot in the springing direction opposite to the driven direction, and to cause the driven wheel and support bar suddenly to so rotate and pivot when the driven teeth of the driven wheel lose contact with the drive teeth of the drive wheel;*

*the decorative unit including:*

*an extension shank connected to the support bar to move in concert with the support bar, the extension shank having a first end connected to the support bar and a second end extending away from the support bar, said sudden pivoting of the support bar in the springing direction caus-*

*ing sudden pivoting of the extension shank in the springing direction and sudden upward and forward movement of the extension shank relative to the base unit;*

*a first link having a first end pivotally connected to the extension shank and configured to pivot relative to the extension shank in a direction opposite to said springing direction and to move upward and forward relative to the base unit in response to said sudden pivoting of the support bar and extension shank in the springing direction;*

*a decorative body connected to a second end of the first link positioned forward of the first end, the decorative body configured to spring upward and forward, and to rotate relative to the extension shank in the direction opposite to said springing direction, in response to said sudden pivoting of the support bar and extension shank in the springing direction; and*

*a second link having a first end pivotally connected to the base unit at a pivotal joint spaced forwardly of the driven wheel and a second end pivotally connected with the first link, the second link being located forward of the support bar and extension shank and configured to pivot relative to the base unit in response to the sudden pivoting of the support bar and extension shank in the springing direction of said sudden pivoting of the support bar and extension shank.*

*6. The apparatus of claim 5, further comprising the drive motor being mounted in a mounting seat of the driving device, the mounting seat mounted on a housing of the base unit.*

*7. The apparatus of claim 6, further comprising the drive wheel being rotatably mounted in the mounting seat.*

*8. The apparatus of claim 5, further comprising a support rack, the first end of the second link being pivotally connected to the support rack.*

*9. The apparatus of claim 5, further comprising*

*a sounder; and*

*a sensor selected from the group consisting of a light sensor, a sound sensor, a footpad control switch or a try-me switch;*

*the sensor being operable to actuate the driving device to cause the drive wheel to rotate in the driving direction and to actuate the sounder when the drive teeth of the drive wheel lose contact with the driven teeth of the driven wheel, so that a sound is emitted substantially simultaneously with the sudden movement of the decorative body.*

* * * * *